May 29, 1923.
A. BACHLE
VEHICLE WINDOW
Filed May 29, 1922
1,456,961
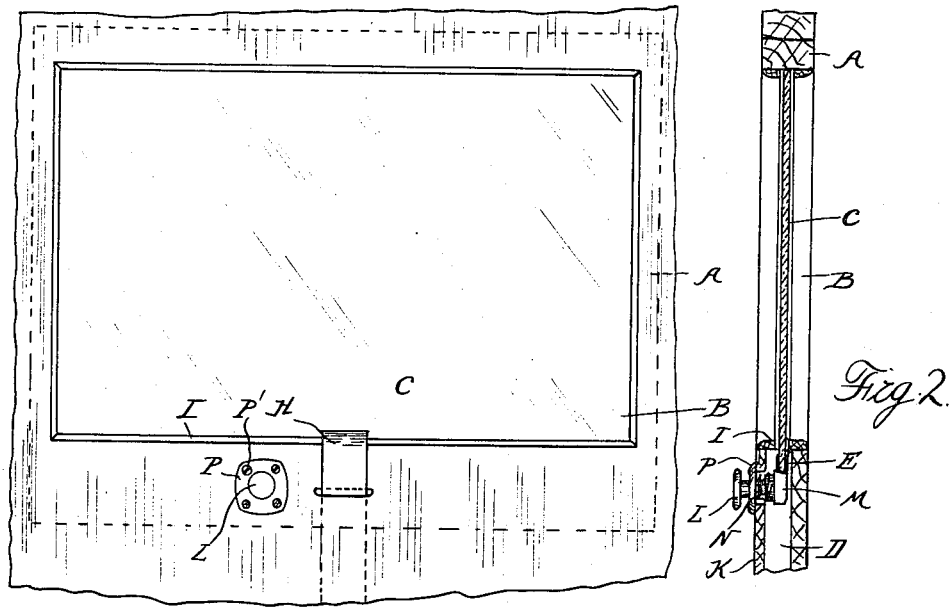
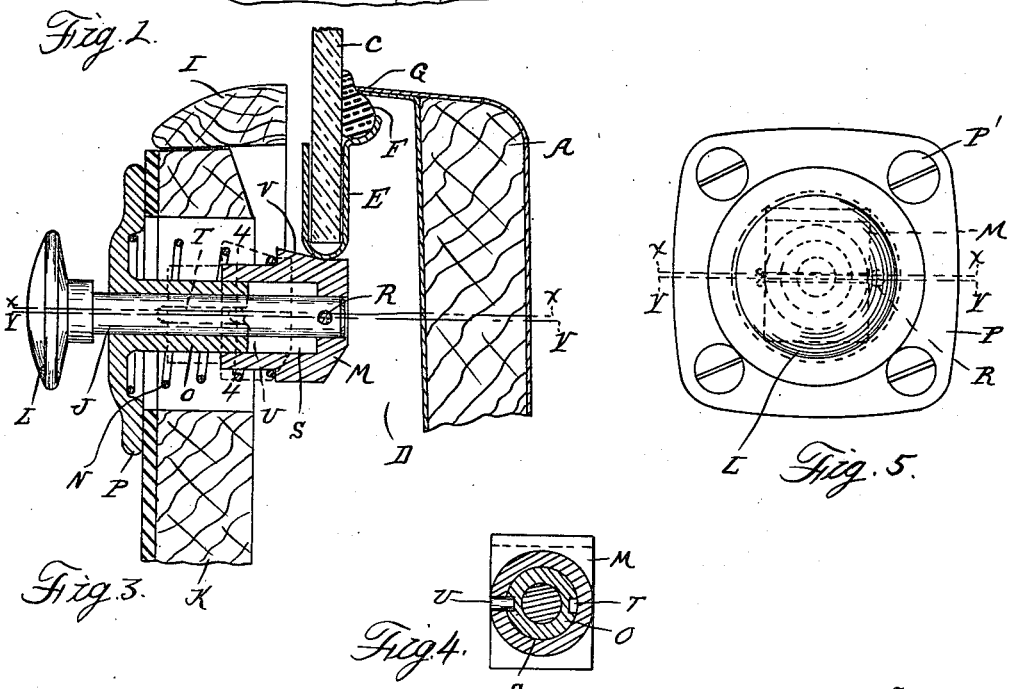
Inventor
Andrew Bachle
By Whittemore, Hulbert, Whittemore & Belknap
Attorney Patented May 29, 1923.

1,456,961

UNITED STATES PATENT OFFICE.

ANDREW BACHLE, OF DETROIT, MICHIGAN.

VEHICLE WINDOW.

Application filed May 29, 1922. Serial No. 564,543.

*To all whom it may concern:*

Be it known that I, ANDREW BACHLE, a citizen of the United States of America, residing at Detroit, in the county of Wayne and State of Michigan, have invented certain new and useful Improvements in Vehicle Windows, of which the following is a specification, reference being had therein to the accompanying drawings.

This invention relates to vehicle windows and relates more particularly to latch devices for vehicle windows:—

It is the object of the invention to provide an improved latch device for holding the vertically sliding closure of a vehicle window in its raised or closed position.

A further object is to provide a common means for retaining a sliding window closure raised and for establishing a sealing engagement between a weather strip extending upon said closure parallel and adjacent to the lower edge thereof and a stationary weather strip.

In the drawings:—

Figure 1 is an interior view of an automobile window equipped with the improved latch device;

Figure 2 is a vertical sectional view of the same taken upon line 2—2 of Figure 1;

Figure 3 is an enlarged view of the latch device as shown in Figure 2;

Figure 4 is a cross section on line 4—4 of Figure 3;

Figure 5 is a interior view of the latch device.

In these views the reference character A designates the vehicle window frame having the opening B for which there is provided a closure formed by the vertically slidable glass plate C. Said plate in its open position is adapted to enter a well or chamber D formed in the frame A below said opening. The lower edge of the glass C is embraced by a channel shaped sheet metal strip E, the edge portion of which adjacent the exterior face of the glass is outwardly bent and fashioned to a trough shape to form a holder for a rubber weather strip F. In the raised or closed position of the glass the rubber strip F is adapted to be compressed against a metal weather strip G carried by the frame A adjacent the opening B. For raising the closure C and for controlling the lowering movement thereof there is employed a flexible strap H formed of any suitable material, said strap being connected at its lower end with the strip E embracing the lower edge of the glass and being extended in its upper portion over the sill I of the window and into the vehicle. Thus by exerting a pull upon the upper end portion of said strap the glass C may be raised and said portion may be stressed also to check lowering of the glass.

For holding the glass in its raised or closed position and also for maintaining a firm engagement between the two said weather strips there is provided a latch device comprising a plunger J mounted transversely to the glass in a cross piece K of the frame, said plunger carrying a control knob L within the vehicle and carrying within the upper portion of the well D a head M urged by a coil spring N to a position beneath the glass C when the latter is in raised position to maintain such position. Said plunger is preferably journaled in a slide bearing formed by a sleeve O passing through the cross piece K and formed integral with a face plate P which is secured to the interior face of said cross piece by screws P'. The latch head M is secured fast upon the inner end of the plunger J by a cotter pin R or equivalent means. Rotation of said plunger and the head thereupon is prevented by forming the head with a bore S concentric with the plunger J which bore adapts the head to slidably embrace the sleeve O. The latter is formed upon its respective sides with channels T and a pin U carried by the head M engages in one of said channels to restrain the head from rotation. The spring N is compressed between the face plate P and head M. The upper face of the head M is beveled, as indicated at V, and when the plunger J is projected to engage beneath the closure C the latter rides upon the bevel face V and is subjected by the same to an upthrust which urges the weather strips F and G into firm sealing engagement. Thus it is seen that the described device accomplishes the triple function of supporting the closure in raised position, exerting an upward pressure upon said closure, restraining the same from rattling and maintaining sealing engagement between the two weather strips respectively carried by the closure and window frame.

It is a feature of the invention that the bearing sleeve O occupies a slightly eccentric relation to the plate P while the openings of said plate engaged by the screws P' are equi-distant from the center of said plate. Thus in Figure 5 there is indicated by the line X—X the true center line of the plate while the center line Y—Y is that of the sleeve O. The importance of this eccentricity lies in the fact that it is difficult to originally mount the plate P in the exact position that will most effectively engage the head M with the closure C when the latter is raised. With the described mounting, however, if the plunger J is not quite high enough to exert the proper upthrust upon the glass the screws P' may be withdrawn and the plate P reversed with respect to its top and bottom edges, the head M being first reversed upon the sleeve O with respect to top and bottom of said head. This reversal of the part accomplishes a slight raising of the plunger such as will ordinarily establish the desired relation between the latch head and the sliding closure.

It is a desirable feature of the described invention that it eliminates any necessity for a transverse swinging of the closure in its raised position, it having hitherto been a common practice to adapt such a closure to be swung transversely into supporting engagement with the sill when raised. As compared to such a swinging construction the invention relieves the operator of the effort necessary to engage or disengage the closure with or from the sill and further avoids necessity of tapering the slideways of the frame to permit of such a swinging movement.

What I claim as my invention is:—

1. In a device of the character described, the combination with a vertically slidable window member and a frame in which said member is mounted, of a slide bearing carried by said frame, a plunger mounted in said slide bearing transversely of the window member and projecting from said bearing at the interior side of the frame, a latch head carried by said plunger and movable thereby into the path of the window member in the raised position of the latter to maintain said position, said head having a portion slidably embracing said slide bearing, means engaging the latch head with the slide bearing to prevent relative rotation, and a spring urging the plunger toward the window member.

2. In a device of the character described, the combination with a vertically slidable window member, of a frame wherein said member is mounted, a latch head for maintaining the raised position of said window member, a plunger transverse to the window member carrying said latch head, said plunger being accessible from the interior side of said frame, a slide bearing engaging said plunger, a spring urging said latch head into the path of the window member, and a face plate eccentrically carrying said slide bearing and secured to the interior face of said frame, said plate being reversible as regards its top and bottom edges to effect a vertical adjustment of the slide bearing and plunger.

3. In a device of the character described, the combination with a vertically slidable window member and a frame wherein said member is mounted, means engageable beneath said window member in the raised position thereof to maintain said position, and a mounting plate for said means attachable to said frame in a plurality of rotatively different positions differentially positioning the supporting means vertically.

4. In a device of the character described, the combination with a vertically slidable window member and a frame mounting said member, a plunger carried by said frame transversely to said window member, said plunger having an actuating extremity projecting at the inner side of said frame, means carried by said plunger within said chamber providing a support for said window member in the raised position thereof, a spring acting upon said plunger urging said support into the path of the window member, a mounting for said plunger, and means engageable with said mounting above and below the plunger for securing the mounting to said frame, the upper and lower securing means being differentially spaced from the axis of said plunger, whereby a vertical adjustment of the plunger may be effected by inverting the mounting.

In testimony whereof I affix my signature.

ANDREW BACHLE.